United States Patent [19]
Bähr et al.

[11] 4,009,116
[45] Feb. 22, 1977

[54] PROCESS OF PREPARING SUBSTANTIALLY ORGANIC WASTE LIQUIDS CONTAINING RADIOACTIVE OR TOXIC SUBSTANCES FOR SAFE, NON-POLLUTIVE HANDLING, TRANSPORTATION AND PERMANENT STORAGE

[75] Inventors: Werner Bähr, Speyer; Stefan Drobnik, Blankenloch; Werner Hild, Hochstetten; Reinhard Kroebel, Leopoldshafen; Alfred Meyer, Cologne; Günter Naumann, Leverkusen, all of Germany

[73] Assignee: Bayer Aktiengesellschaft, Germany
[22] Filed: Dec. 20, 1974
[21] Appl. No.: 534,772

[30] Foreign Application Priority Data
Dec. 20, 1973 Germany .................... 2363474

[52] U.S. Cl. .................. 252/301.1 W; 260/23 S; 526/329; 526/336
[51] Int. Cl.² ....................................... G21F 9/16
[58] Field of Search .......... 252/301.1 W; 260/23 S, 260/88.2 C

[56] References Cited
UNITED STATES PATENTS 3,142,648  7/1964  LeFillatre et al. ......... 252/301.1 W
3,298,960  1/1967  Pitzer ....................... 252/301.1 W
3,463,738  8/1969  Fitzgerald et al. ......... 252/301.1 W
3,838,061  9/1974  Cuaz et al. ................ 252/301.1 W FOREIGN PATENTS OR APPLICATIONS
962,582  7/1964  United Kingdom ....... 252/301.1 W OTHER PUBLICATIONS
Chem. Abstracts, vol. 71, No. 73835b "Polymer-Encapsulation . . . Particles".
Mark, H., Ed., Encyclopedia of Polymeric Sci. & Tech. Interscience Publishers, New York, 1970, vol. 13, pp. 146-151.

Primary Examiner—Benjamin R. Padgett
Assistant Examiner—Deborah L. Kyle
Attorney, Agent, or Firm—Connolly and Hutz

[57] ABSTRACT

A process of preparing substantially organic waste liquids containing radioactive or toxic substances for safe, non-pollutive handling, transportation and permanent storage, wherein the liquids are mixed with polymerizable mixtures consisting essentially of one or more monomeric monovinyl compounds and one or more polyvinyl compounds and polymerization catalysts, and the resulting mixtures are converted into solid blocks by polymerization at temperatures in the range of from 15° to 150° C.

8 Claims, No Drawings

PROCESS OF PREPARING SUBSTANTIALLY ORGANIC WASTE LIQUIDS CONTAINING RADIOACTIVE OR TOXIC SUBSTANCES FOR SAFE, NON-POLLUTIVE HANDLING, TRANSPORTATION AND PERMANENT STORAGE

A process of preparing substantially organic waste liquids containing radioactive or toxic substances for safe, non-pollutive handling, transportation and permanent storage.

This invention relates to a process of preparing substantially organic waste liquids containing radioactive or toxic substances for safe, non-pollutive handling, transportation and permanent storage, the liquids being brought into contact with organic material and left to harden into solid masses.

It is known that, in nuclear engineering, for example in reactor operation, liquids contaminated by radioactivity accumulate as waste solutions during isotope recovery or during the decontamination of plant and equipment. Reference is made in particular to radioactive extractants, for example tri-n-butyl phosphate, which accumulate during the regeneration of nuclear fuels by liquid-liquid extraction.

It is known that waste solutions of this kind, for example degraded extractants, can be stored in tanks (J. J. Demo jr: "Effect of low concentrations of acid and water on the corrosion of metals in organic solvents" AED-Conf. 1968, No. 314–004; 6th Annual Liberty Bell Corrosion Short Course, Philadelphia, Pa., Sept. 17–19, 1968), or mixed with cement slurry, optionally after absorption into a porous substance, for example vermiculite, and thereby stored embedded in hard cement.

Tank storage has proved problematical on account of the corrosion phenomena occurring in conjunction with the liquids to be stored. Disadvantages of embedding in cement include the large volumes of waste which this involves, the danger of separation of the organic phase during mixing or setting, the frequently poor setting properties of cement with respect to the waste solutions to be embedded, and the inadequate extraction behaviour of the waste solutions embedded in the cement.

Attempts have been made to burn solvents of the kind in question, although this leads to serious problems of corrosion in the combustion furnace because of the formation of phosphoric acid, and gives rise to difficulties in regard to waste-gas purification.

Distillation has also been proposed. However, it involves the danger of decomposition when applied to esters of phosphoric acid and, in addition, does not give distillates free from radioactivity.

The object of the present invention is to provide a process which eliminates the disadvantages and dangers inherent in conventional processes for eliminating organic waste liquids, and in which organic waste liquids containing radioactive or toxic substances or adducts of extractants with inorganic acids or salts, and consisting of one or more organic phases or of at least one organic phase and one aqueous phase, are irreversibly solidified. The process is intended to be able to be carried out inexpensively without appreciable outlay on plant by only briefly trained personnel. It is intended to provide non-pollutive solidification products which can be handled safely and transported safely to a permanent storage site.

According to the invention, this object can be achieved surprisingly easily by mixing the liquids with polymerisable mixtures consisting of one or more monomeric monovinyl compounds and one or more polyvinyl compounds and polymerisation catalysts, and converting the resulting mixture into solid blocks by polymerisation at temperatures in the range of from 15° to 150° C preferably of from 15° to 50° C.

The waste liquids are preferably used in quantities of from 20 to 75%, particularly of from 30 to 60% by weight, based on the total weight of waste liquid + polymerisation mixture. The monovinyl compounds are preferably used in a quantity of from 70 to 99%, particularly of from 80 to 95% by weight, based on the weight of the monomers, the polyvinyl compounds are preferably used in a quantity of from 1 to 30%, particularly of from 5 to 20% by weight, based on the weight of the monomers and the polymerisation catalysts are preferably used in a quantity of from 0.05 to 6% particularly of from 0.2 to 4% by weight based on the weight of the monomer.

The process according to the invention may be carried out at normal pressure but also at elevated pressure.

The following represent suitable monovinyl compounds: styrene, methyl styrene, acrylic acid, methacrylic acid, acrylonitrile, acrylic acid esters, methacrylic acid esters, vinyl anisole, vinyl napthalene, methyl acrylate, ethyl acrylate, propyl acrylate, isopropyl acrylate, butyl acrylate, tert.-butyl acrylate, ethyl hexyl acrylate, cyclohexyl acrylate, isobornyl acrylate, benzyl acrylate, phenyl acrylate, alkyl phenyl acrylates, ethoxy methyl acrylate, ethoxy ethyl acrylate, ethoxy propyl acrylate, propoxy methyl acrylate, propoxy ethyl acrylate, ethoxy phenyl acrylate, ethoxy benzyl acrylate, ethoxy cyclohexyl acrylate, ethyl methacrylate, propyl methacrylate, isopropyl methacrylate, butyl methacrylate, tert.-butyl methacrylate, ethyl hexyl methacrylate, cyclohexyl methacrylate, isobornyl methacrylate, benzyl methacrylate, phenyl methacrylate, alkyl phenyl methacrylate, ethoxy methyl methacrylate, ethoxy ethyl methacrylate, ethoxy propyl methacrylate, propoxy methyl methacrylate, propoxy propyl methacrylate, ethoxy phenyl methacrylate, ethoxy benzyl methacrylate, vinyl toluene, vinyl chloride, vinyl acetate and vinylidene chloride. Polyethylenically unsaturated monomers such as isoprene, butadiene and chloroprene, which generally behave as if they had only one double bond, are also suitable. It is also possible to use heterocyclic monovinyl compounds, such as vinyl pyridine, 2-methyl-5-vinyl pyridine, 2-ethyl-5-vinyl pyridine, 3-methyl-5-vinyl pyridine, 2,3-dimethyl-5-vinyl pyridine, 2-methyl-3-ethyl-5-vinyl pyridine, 2-methyl-5-vinyl quinoline, 4-methyl-4-vinyl quinoline, 1-methyl- or 3-methyl-5-vinyl isoquinoline and vinyl pyrrolidone.

It is particularly preferred to use styrene, vinyl toluene and methyl acrylate.

The following are mentioned as examples of polyvinyl compounds: divinyl benzene, divinyl pryidine, divinyl toluenes, divinyl naphthalenes, diallyl phthalate, ethylene glycol diacrylate, ethylene glycol dimethacrylate, divinyl xylene, divinyl ethyl benzene, divinyl sulphone, polyvinyl or polyallyl ethers of glycol, glycerol and pentaerythritol, divinyl ketone, divinyl sulphide, allyl acrylate, diallyl maleate, diallyl fumarate, diallyl succinate, diallyl carbonate, diallyl malonate, diallyl oxylate, diallyl adipate, diallyl sebacate, divinyl sebacate, dially tartrate, diallyl silicate, triallyl tricarballylate, triallyl aconitate, triallyl citrate, triallyl phosphate, N,N'-methylene diacrylamide, N,N'-methylene dimethacryl amide, N,N'-ethylene diacryl amide, 1,2-di-(α-methyl methylene sulphonamido)-ethylene, trivinyl benzene, trivinyl naphthalene and polyvinyl anthracenes.

It is particularly preferred to use divinyl benzene and trivinyl benzene.

The polymerisation catalysts used in the claimed process are the catalyst usually applied in the polymerisation of monovinyl and polyvinyl compounds e.g. acetyl peroxide, tert.-butyl hydroperoxide, cumene peroxide, lauryl peroxide, methyl ethyl ketone peroxide, tetralin peroxide and persulphates. Preferred are those polymerisation catalysts which react already at low temperatures e.g. room temperature such as azo-bis-isobutyronitrile.

Examples of suitable waste liquids include all the compounds which are normally used as extractants in liquid-liquid extraction and which are contaminated by radioactivity, for example as a result of their use in the treatment or separation of radioactive substances. Compounds of this kind come from a variety of different classes such as esters, especially acid and neutral esters of acids of phosphorus, also sulphides, oxides, aliphatic and aromatic sulphoxides, amine oxides, phosphine oxides and arsine oxides. It is also possible to use primary, secondary and tertiary amines, as well as ammonium and sulphonium salts, also ketones, ethers, carboxylic acids, sulphonic acids, mercaptones, oximes, lactams, hydroxyl amines, quinolines and pyrazoles. The following are mentioned as examples of esters of acids of phosphorus: dibutyl phosphate, diamyl phosphate, dipentyl phosphate, dihexyl phosphate, diheptyl phosphate, dioctyl phosphate, dinonyl phosphate, didecyl phosphate, diundecyl phosphate, didodecyl phosphate, ditridecyl phosphate, ditetradecyl phosphate, dipentadecyl phosphate, dihexadecyl phosphate, butylamyl phosphate, butyl hexyl phosphate, butyl oxtyl phosphate, hexyl lauryl phosphate, tributyl phosphate, triamyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, dihexylnonyl phosphate, didodecyl phosphate, octyl nonyl decyl phosphate, N,N-dibutyl diethyl carbamyl phosphate, triisobutyl phosphate, triisooctyl phosphate, diisooctyl phosphate, triisooctyl thiophosphate, monoisooctyl dihydrogen phosphate tetrabutyl hypophosphate, tetrabutyl pyrophosphate, n-dodecyl hypophosphate, monoctyl phosphate, dioctyl phosphate, diisooctyl phenyl phosphordithionate, di-n-butyl phosphorothioic acid and diheptyl phenyl phosphordithionate.

Other suitable esters include butyl acetate, acetic acid-i-amyl ester, toluene sulphonic acid methyl ester, benzoic acid-(2-chloro)-ethyl ester and salicylic acid ethyl ester.

The following are mentioned as examples of oxides: tributyl phosphine oxide, triamyl phosphine oxide, trihexyl phosphine oxide, trioctyl phosphine oxide, trinonyl phosphine oxide, tridecyl phosphine oxide, triundecyl phosphine oxide, tridodecyl phosphine oxide, tridiphenyl phosphine oxide, tridephenyl phosphine oxide, dibutylamyl phosphine oxide, dihexyl heptyl phosphine oxide, dioctyl lauryl phosphine oxide, hexyl octyl lauryl phosphine oxide, diphenyl benzyl phosphine oxide, dodecyl phospholine oxide, tetrahexyl methylene diphosphine oxide, tetra-(2-ethyl)-hexyl methylene diphosphine oxide, tetraoctyl methylene diphosphine oxide, tetraoctyl ethylene diphosphine oxide, tetraoctyl propylene diphosphine oxide, tetraoctyl butylene diphosphine oxide, tetraoctyl hexylene diphosphine oxide, teraoctyl octylene diphosphine oxide, tetraoctyl decylene diphosphine oxide, hexyoctyl tributylene tetraphosphine oxide, decaoctyl heptabutylene octaphosphine oxide, di-n-amyl sulphoxide, di-n-hexyl sulphoxide, di-n-heptyl sulphoxide, di-n-octyl sulphoxide, diisooctyl sulphoxide, di-n-nonyl sulphoxide, di-n-decyl sulphoxide, di-n-undecyl sulphoxide, didodecyl sulphoxide, p-tolyl sulphoxide, tri-n-amyl amine oxide, tri-n-octyl amine oxide, triisooctyl amine oxide, tri-n-dodecyl amine oxide, tri-n-octyl arsine oxide and tri-n-octyl phosphine sulphide.

The following are mentioned as examples of amines: octyl amine, nonyl amine, decyl amine, undecyl amine, lauryl amine, dihexyl amine, dihexyl amine, diheptyl amine, dioctyl amine, dinonyl amine, didecyl amine, diundecyl amine, dilauryl amine, tetradecyl amine, pentadecyl amine, hexadecyl amine, ditridecyl amine, ditetradecyl amine, dipentadecyl amine, hexyl nonyl amine, hexyl decyl amine, hexyl undecyl amine, hexyl dodecyl amine, hexyl lauryl amine, hexyl hexadecyl amine, heptyl octyl amine, heptyl nonyl amine, hexyl undecyl amine, hexyl pentadecyl amine, nonyl decyl amine, nonyl lauryl amine, nonyl tetradecyl amine, lauryl tetradecyl amine, tributyl amine, triamyl amine, trihexyl amine, triheptyl amine, trioctyl amine, trinonyl amine, tridecyl amine, triundecyl amine, trilauryl amine, tritetradecyl amine, tripentadecyl amine, trihexadecyl amine, dibutyl amyl amine, butyl diamyl amine, dioctyl nonyl amine, dioctyl lauryl amine, hexyl heptyl octyl amine, tricapryl amine, N-dodecenyl trialkyl methyl amines, N-lauryl trialkyl methyl amines, methyl diphenyl amine, aniline diphenylamine, o-, m-, p-tolidine and xylidines.

The following are mentioned as examples of quaternary ammonium salts: tributylmethyl ammonium chloride, tripentyl methyl ammonium chloride, trihexyl methyl ammonium chloride, triheptyl methyl ammonium chloride, trioctyl methyl ammonium chloride, trinonyl methyl ammonium chloride, tridecyl methyl ammonium chloride, triundecyl methyl ammonium chloride, trilauryl methyl ammonium chloride, tributyl ethyl ammonium chloride, tripentyl ethyl ammonium chloride, trihexyl ethyl ammonium chloride, triheptyl ethyl ammonium chloride, trioctyl ethyl ammonium chloride, trinonyl ethyl ammonium chloride, tridecyl ethyl ammonium chloride, triundecyl ethyl ammonium chloride, trilauryl ethyl ammonium chloride, tributyl propyl ammonium chloride, tripentyl propyl ammonium chloride, trihexyl propyl ammonium chloride, triheptyl propyl ammonium chloride, trioctyl propyl ammonium chloride, trinonyl propyl ammonium chloride, tridecyl propyl ammonium chloride, triundecyl propyl ammonium chloride, trilauryl propyl ammonium chloride, tetrabutyl ammonium chloride, triamyl butyl ammonium chloride, trihexyl butyl ammonium chloride, triheptyl butyl ammonium chloride, trioctyl butyl ammonium chloride, tributyl amyl ammonium chloride, tetraamyl ammonium chloride, trihexyl amyl ammonium chloride, trioctyl amyl ammonium chloride, tributyl hexyl ammonium chloride, triheptyl hexyl ammonium chloride, trioctyl hexyl ammonium chloride, dibutyl amyl methyl ammonium chloride, butyl diamyl methyl ammonium chloride, butyl diamyl propyl ammonium chloride, dioctyl lauryl butyl ammonium chloride, methyl tricapryl ammonium chloride, diisobutyl phenoxy ethyl dimethyl benzyl ammonium chloride, diisobutyl creoxy ethyl dimethyl benzyl ammonium chloride, methyl dodecyl benzyl trimethyl ammonium chloride and methyl dodecyl xylene-bis-(trimethyl ammonium chloride).

The following are mentioned as examples of trialkyl sulphonium salts: trioctyl sulphonium chloride, trinonyl sulphonium chloride, tridecyl sulphonium chloride, triundecyl sulphonium chloride, tridodecyl sulphonium chloride, tritetradecyl sulphonium chloride, trihexadecyl sulphonium chloride and di-decyl-monomethyl sulphonium chloride.

The following are mentioned as examples of ethers: isopropyl ether, bis-(2-butoxy ethyl ether), ethylene glycol-bis-(2-cyanoethyl ether) and 1,2,3-tris-(2-cyanoethoxy)-hexane.

The following are mentioned as examples of ketones: n-dibutyl ketone, n-dibutyl ketone, n-diamyl ketone, n-dihexyl ketone, n-dioctyl ketone, acetyl acetone, acetophenone and benzophenone.

Suitable carboxylic acids are linear or branched, optionally halogen-substituted acids with 5 to 18 carbon atoms, those containing from 7 to 16 carbon being preferred. The following carboxylic acids are mentioned by way of example: valeric acid, caproic acid, oenanthic acid, caprylic acid, pelargonic acid, capric acid, laurylic acid, myristic acid, palmitic acid, margaric acid, stearic acid, 4-phenyl valeric acid and α-bromolauric acid.

The following are mentioned as examples of sulphonic acids: dinonyl naphthalene sulphonic acid, m-xylidine sulphonic acid and di-n-octyl thiosulphuric acid.

The following are mentioned as examples of oximes: benzyl oxime, 2-hydroxy-5-dodecyl benzophenone oxide and 5,8-diethyl-7-hydroxy-6-dodecanone oxime.

It is also possible to use phosphonates of the general formula (I):

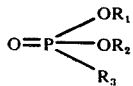

(I)

in which $R_1$, $R_2$, and $R_3$, independently of one another, each represents a linear or branched $C_4$–$C_{16}$-alkyl radical, preferably a $C_5$–$C_{12}$-alkyl radical.

Examples of phosphonates of this kind are butane dibutyl phosphonate, pentane diamyl phosphonate, hexane dihexyl phosphonate, heptane diheptyl phosphonate, octane dioctyl phosphonate, nonane dinonyl phosphonate, decane didecyl phosphonate, undecane diundecyl phosphonate, dodecane didodecyl phosphonate, tetradecane ditetradecyl phosphonate, pentadecane dipentadecyl phosphonate and hexadecane dihexadecyl phosphonate.

It is also possible to use phosphinates corresponding to the general formula (II):

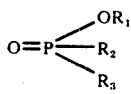

(II)

in which $R_1$, $R_2$ and $R_3$ are defined in reference to general formula (I).

The following phosphinates are mentioned by way of example: dibutane butyl phosphinate, dipentane pentyl phosphinate, dihexane hexyl phosphinate, diheptane heptyl phosphinate, dioctane octyl phosphinate, dinonane nonyl phosphinate, didecane decyl phosphinate, diundecane undecyl phosphinate, didodecane dodecyl phosphinate, ditetradecane tetradecyl phosphinate, dipentadecane pentadecyl phosphinate and dihexadeca hexadecyl phosphinate.

The following are mentioned as examples of other liquids which can be included in polymers by the process according to the invention: 7-dodecyl-8-hydroxy quinoline, 8-hydroxy quinoline, N-benzoyl phenyl hydroxyl amine, i- octyl thioglycolate, caprolactam, diphenyl thiocarbazone, tert.-hexyl decyl mercaptan, N-hexadecyl-N'-phenyl urea, N-oleyl hydroxyl amine, tetrachlorhydroquinone, glyoxal-bis-(2-hydroxyanil), phenyl benzohydroxamic acid, 1-thenoyl(2')-3,3,3-trifluoro-acetone, 7-(carboxy methoxy anilinobenzyl)-hydroxy quinoline, didodecyl dithiooxamide, heptadecane-2,3-dione dioxime, N-(p-hexadecyl phenyl)-salicyl aldimine, N-(n-octyl)-4-(2,2,4,4-tetramethyl butyl)-salicylaldimine, tetraphenyl boron, diisobutyl carbinol, 4-sec.-butyl-2-(α-methyl benzyl)-phenol, 4-tert.butyl-2-(α-octyl sulphinyl)-methanes, N-benzoyl phenyl hydroxyl amines, N,N-dibutyl diethyl carbamyl phosphonates, dibenzoyl methanes, dicyano diethyl sulphide, dimethyl disulphide, dibutyl diglycol, 2-methyl quinoline, tetra-2-methyl hexyl phosphonium chloride, tetrabutyl methylene diphosphonate, tetrabutyl ethylene diphosphonate, acetyl pivalyl methane, trifluoroacetyl pivalyl methane, pentafluoropropanoyl pivalyl methane, heptafluorobutanoyl pivalyl methane and also substituted pyrazoles corresponding to the formula (III):

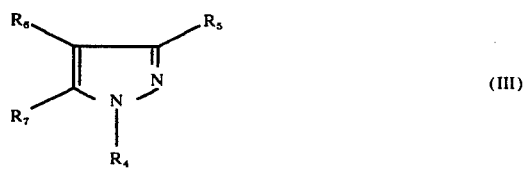

(III)

in which $R_4$ may represent hydrogen, a methyl, ethyl, n-butyl, phenyl or benzyl radical, whilst $R_5$, $R_6$ and $R_7$ are determined by the relations $R_5 = R_7 = CH_2C_nH_{2n+1}$ and $R_6 = C_nH_{2n+1}$, where $n$=3,4,5 or 6.

The liquids mentioned above may be used either individually or in admixture in the process according to the invention.

The following are mentioned as examples of liquid mixtures: tributyl phosphate/trioctyl phosphine oxide, tributyl phosphate/trioctyl phosphate, tributyl phosphate/trioctyl phosphoric acid, tributyl phosphate/dibutyl phosphoric acid, tributyl phosphate/trioctyl phosphate/dioctyl phosphate, tributyl phosphate/trioctyl phosphate/trioctyl phosphine oxide, trioctyl amine/trinonyl amine, tricotyl amine/trilauryl methyl ammonium chloride, trioctyl amine/aniline/tetrabutyl ammonium nitrate, dioctyl phosphoric acid/dithizone, caprylic acid/triisooctyl phosphate and butyl acetate/dibutyl ether/butanol.

The quantitative ratio of the individual liquids in mixtures of this kind is arbitrary and may vary within wide limits.

Toxic liquids suitable for use in the process according to the invention are either liquids of the kind which are themselves toxic or which contain toxic substances in solution. The following are mentioned as examples of toxic liquids: dithophosphoric acid-(1,2-dicarbethoxy ethyl)-o,o-dimethyl ester (malathion) and 0,0-diethyl-0-(4-nitrophenyl)-monothiophosphate (parathion).

It is also possible by the process according to the invention to treat liquid systems consisting of two or more phases which either show limited miscibility with one another or which are substantially immiscible with one another. The following are mentioned as examples of liquid systems of this kind: tributyl phosphate/aqueous phosphoric acid, tributyl phosphate/aqueous sulphuric acid, dibutyl phosphoric acid/aqueous mineral acids, dioctyl phosphoric acid/aqueous mineral acids and trioctyl amine/aqueous mineral acids.

The concentration of the acids in liquid systems of this kind is generally from 1 to 50%, acid concentrations of from 5 to 25% being preferred.

In cases where aqueous acids, for example phosphoric acid and sulphuric acid, are present in multiphase liquid systems of this kind, it has proved to be advantageous to reduce the $H^+$-concentrations in the waste liquid before mixing it with the polymerisation mixture. This is especially true for waste liquids consisting of an aqueous mineral acid solution in admixture with extractants or with extractants dissolved in solution promotors wherein the molar ratio of mineral acid to extractant is more than 1:1.

The reducing of the $H^+$-concentration can be achieved by neutralising with basic compounds. As basic compounds there are used preferably the hydroxides or oxides of alkaline earth metals, e.g. calcium oxide or magnesium oxide. As cation exchangers there are used the known weakly crosslinked macroporous or gel typ cation exchangers. In the presence of highly concentrated acids, e.g. acids of 85% and more strength it may be advantageous to reduce the $H^+$-concentration by the addition of water binding substances, e.g. dry weakly crosslinked ion exchangers.

The process according to the invention is also suitable for the hardening of waste liquids consisting of organic old oils or organic pump oils, lubricants or soaps. When processing waste liquids of this kinds it has proved to be advantageous, to add to the liquids swelling agents for vinyl polymers before mixing them with the polymerisation mixture.

These swelling agents are generally added in quantities of from 3 to 50% by weight and preferably in quantities of from 5 to 30% by weight, based on the weight of the monomers.

The process according to the invention is generally carried out by adding at room temperature the waste liquids, optionally after the addition of a neutralising compound, or a swelling agent for the vinyl polymers, with stirring to the polymerisation mixture consisting of the monomeric monovinyl and polyvinyl compound and the polymerisation catalyst, and to leave the mixture to itself. By the energy evolved by the polymerisation reaction the mixture is warmed to about 30° to 70° C.

The reaction mixtures generally harden after 2 hours to 30 days to form a solid block and may advantageously be transported and/or stopped either in the polymerisation vessel itself or following removal therefrom. The polymerisation may be speed up by external warming.

By virtue of the process according to the invention, it is possible to process radioactive liquids with an activity of 0 to 5 ci/l, preferably from 0 to 1 ci/l of solid block.

EXAMPLE 1

100 kg of radioactive tri-n-butyl phosphate are added with stirring to 41 kg of 53.7% divinyl benzene, 108 kg of styrene and 3 kg of azo-bis-isobutyronitrile accommodated in a 250-liter vessel. The mixture to be polymerised is left standing at 20° C. In this way, a homogeneous block is obtained after 21 days.

EXAMPLE 2

133 kg of radioactive tri-n-butyl phosphate and 24.5 kg of 85% phosphoric acid are added with stirring to 8.5 kg of 53.7% divinyl benzene, 134 kg of styrene and 3 kg of azo-bis-isobutyronitrile accommodated in a 250 kg-capacity vessel. The mixture is left standing at 23° C, a solid homogeneous block being obtained after 18 days.

EXAMPLE 3

65 kg of radioactive tri-n-butyl phosphate and 25 kg of 85% phosphoric acid are added to 79 kg of 53.7% divinyl benzene, 134 kg of styrene and 3 kg of azo-bis-isobutyronitrile accommodated in a 250 litre-capacity vessel. The mixture is left to stand at 25° C, a solid homogeneous block being obtained after 16 days.

EXAMPLE 4

150 kg of radioactive tri-n-butyl phosphate containing 24% by volume of dodecane, and 0.05 mol of phosphoric acid, are added to 82 kg of styrene, 16 kg of 60.4% divinyl benzene and 2 kg of azo-bisisobutyronitrille accommodated in a 250 litre-capacity vessel. The tri-n-butyl phosphate has the following radioactive contaminations:

$1.1 \cdot 10^{-3}$ ci/m$^3$ of $\alpha$-rays $4.6 \cdot 10^{-1}$ ci/m$^3$ of $\beta + \gamma$-rays The mixture is left standing at room temperature for 20 days, a solid homogeneous block being obtained in this way. Extraction behaviour (examined by the static test method using distilled water) was checked at intervals over this period of 20 days. Extraction with distilled water after 14 days only amounted to $10^{-3}$ g . cm$^{-2}$ . d$^{-1}$ .

EXAMPLE 5

A mixture of 18 kg of 53.7% divinyl benzene, 78 kg of styrene, 2.8 kg of azo-bis-isobutyronitrile, 27 kg of radioactive tri-n- butyl phosphate with a totoal activity of 0.13 Ci/l and 15 kg of 85% phosphoric acid, is prepared in a 250 liter-capacity vessel. 5 kg of a weakly crosslinked dry, standard anion exchanger are added to the resulting mixture. The mixture is left to stand at 21° C, a solid homogeneous block being obtained after 20 days.

EXAMPLE 6

A mixture of 10 kg of 53.7% divinyl benzne, 60 kg of styrene, 2 kg of azo-bis-isobutyronitrile, 26 kg of radioactive tri-n-butyl phosphate (as in Example 5) and 20 kg of 85% phosphoric acid, is prepared in a 250 liter-capacity vessel. 4 kg of a weakly crosslinked, dry standard anion exchanger are added to the resulting mixture. The mixture is left to stand at 24° C. In this way, a solid homogeneous block is obtained after 16 days.

EXAMPLE 7

A mixture of 15 kg of 53.7% divinyl benzene, 40 kg of styrene, 1 kg of azo-bis-isobutyronitrile, 27 kg of radioactive tri-n-butyl phosphate (as in Example 5) and 30 kg of 85% phosphoric acid, is prepared in a 250 liter-capacity vessel. 10 kg of a weakly crosslinked dry, standard anion exchanger are added with stirring to the resulting mixture. The mixture is then left to stand at 19° C. In this way, a solid homogeneous block is obtained after 28 days.

EXAMPLE 8

A mixture of 26 kg of 53.7% divinyl benzene, 65 kg of styrene, 2 kg of azo-bis-isobutyronitrile, 65 kg of radioactive tri-n-butyl phosphate (as in Example 5) and 70 kg of 85% phosphoric acid, is prepared in a 250 liter-capacity vessel. 25 kg of a weakly crosslinked dry, standard anion exchanger are added with stirring to the resulting mixture. The mixture is then left to stand at 24° C. In this way, a solid homogeneous block is obtained after 18 days.

EXAMPLE 9

A mixture of 14 kg of 56% divinyl benzene, 63 kg of styrene and 1 kg of azo-bis-isobutyronitrile is prepared in a 250 liter-capacity vessel. 115 kg of a mixture consisting of radioactive tri-n-butyl phosphate acid, the mixture containing 2 mols of phosphoric and phosphoric acid, (molar ratio 1:2) after being neutralised with 24 kg of calcium oxide are added with stirring to the first mixture. The resulting mixture has a total activity of 1.34 Ci/l. It is left to stand at room temperature, a solid homogeneous block being obtained after 4 weeks.

EXAMPLE 10

30 kg of a radioactive pump oil with a total activity of 1.2 m Ci/l are added with stirring to 93.8 kg of styrene, 3.2 kg of 60% divinyl benzene and 3 kg of azo-diisobutyronitrile accommodated in a 250 liter-capacity vessel. The mixture is left to stand for 4 weeks, a solid homogeneous block being obtained in this way.

EXAMPLE 11

A solution of 16 kg of toluene and 60 kg of radioactive pump oil (as in Example 10) is added to a mixture of 93.8 kg of styrene, 3.2 kg of 60% divinyl benzene and 3.0 kg of azo-diisobutyronitrile accommodated in a 250 liter-capacity vessel. The solutions are mixed with one another by intensive stirring. The mixture is left to stand at 23° C, a solid homogeneous block being obtained after about 4 weeks.

EXAMPLE 12

A solution of 48 kg of toluene and 60 kg of radioactive pump oil (as in Example 10) is added to a mixture of 88.9 kg of styrene, 8.1 kg of 60% divinyl benzene and 3.0 kg of azo-diisobutyrodinitrile in a 250 liter-capacity vessel. The mixture is left to stand at room temperature, a solid homogeneous block being obtained after 4 weeks.

EXAMPLE 13

A mixture of 16 kg of 60% divinyl benzene, 82 kg of styrene and 2 kg of azo-bis-isobutyronitrile is prepared in a pressure vessel. 150 kg of radioactive tri-n-butyl phosphate (as in Example 5) are added to the resulting solution, and the mixture is heated at 80° C under a pressure of 1.5 atmospheres. In this way, a solid homogeneous block is obtained after 30 minutes.

EXAMPLE 14

125 kg of radioactive tri-n-butyl phosphate (as in Example 5) and 25 kg radioactive bis-2-ethyl hexyl phosphoric acid ester, are added to a mixture of 43 kg of 54% divinyl benzene, 110 kg of vinyl toluene and 3 kg of benzoyl peroxide in a 250 liter-capacity vessel. The mixture is heated to 60° C and, after 24 hours, has polymerised to form a homogeneous, solid block.

EXAMPLE 15

50 kg of dithiophosphoric acid (1,2-dicarbethoxy ethyl-0,0-dimethyl ester (malathion) are added to a mixture of 80 kg of 54% divinyl benzene, 135 kg of styrene and 3 kg of azo-bis-isobutyronitrile in a 250 liter-capacity vessel. The mixture is heated to 40° C, a solid homogeneous block being obtained after 2 days.

EXAMPLE 16

85 kg of 0,0-diethyl-0-(4-nitrophenyl)-monothiophosphate (parathion) are added to a mixture of 25 kg of 85% divinyl benzene, 140 kg of styrene and 3 kg of benzoyl peroxide in a 250 liter-capacity vessel. The mixture is left to stand at room temperature, a solid homogeneous block being obtained after 23 days.

We claim:

1. In the process of preparing a substantially organic waste liquid containing a radioactive or toxic substance for safe, non-pollutive handling, transportation and permanent storage by solidifying the liquid with a hardening material, the improvement which comprises mixing the liquid with a polymerizable mixture consisting essentially of at least one monomeric monovinyl compound, at least one monomeric polyvinyl compound and a polymerization catalyst and then polymerizing the resulting mixture into a solid homogeneous block at a temperature of from 15° to 150° C., the waste liquid being employed in an amount of from 20 to 75% by weight, based on the total weight of the waste liquid and the polymerizable mixture, the monovinyl compound being employed in an amount of 70 to 99% by weight, based on the total weight of the monomers, the polyvinyl compound being employed in an amount of from 1 to 30% by weight, based on the total weight of the monomers, and the polymerization catalyst being used in an amount of from 0.05 to 6% by weight, based on the total weight of the monomers.

2. The process of claim 1 wherein the waste liquid is employed in an amount of from 30 to 60% by weight, based on the total weight of the waste liquid and the polymerizable mixture, the monovinyl compound is employed in an amount of from 80 to 95% by weight, based on the total weight of the monomers, the polyvinyl compound is employed in an amount of from 5 to 20% by weight, based on the total weight of the monomers, and the polymerization catalyst is employed in an amount of from 0.2 to 4% by weight, based on the total weight of the monomers.

3. The process of claim 1 wherein styrene, vinyl toluene and acrylic acid methyl ester are employed as monovinyl compounds and divinyl benzene and trivinyl benzene are employed as polyvinyl compounds.

4. The process of claim 1 wherein the waste liquid consists of an aqueous mineral acid and an extractant, the molar ratio of acid to extractant being greater than 1:1 and the $H^+$-concentration is reduced before mixing the liquid with the polymerization mixture.

5. The process of claim 4 wherein the $H^+$-concentration is reduced by the addition of a basic compound or cation exchange resin.

6. The process of claim 1 wherein the waste liquid consists of an organic oil or soap and a swelling agent for a vinyl polymer is added before mixing the waste liquid with the polymerization mixture.

7. The process of claim 6 wherein toluene or xylene is used as the swelling agent.

8. The product produced by the process of claim 1.

* * * * *